Patented Oct. 8, 1929

1,730,723

UNITED STATES PATENT OFFICE

HUGH S. COOPER, OF CLEVELAND, OHIO, ASSIGNOR TO KEMET LABORATORIES COMPANY, INC., A CORPORATION OF NEW YORK

PROCESS OF PREPARING THORIUM HYDRIDE

No Drawing. Application filed October 3, 1925. Serial No. 60,315.

The invention is a process for preparing thorium hydride.

In applications Ser. No. 747,674 filed Nov. 3, 1924, and Ser. No. 28,026 filed May 4, 1925, I have described the production of certain thorium-containing alloys by processes wherein the thorium is converted into its hydride $ThH_4$ before alloying it with other metals. It is my present opinion that the degree of success which attends such processes is largely dependent upon the purity of the thorium hydride and its freedom from uncombined thorium and oxygen compounds. The object of the present invention is the preparation of a superior grade of hydride and one especially adapted for use in such processes as those described in my prior applications referred to.

Whereas prior investigators report that thorium hydride is not formed below 600° C., I have found that relatively pure thorium, such as may be prepared by the process described in my application Ser. No. 713,299, filed May 14, 1924, hereinafter referred to as "substantially pure thorium", combines readily with hydrogen at temperatures as low as 300° C. I have also found a serious error in the reported observations of the temperature at which thorium combines with oxygen. Instead of being ignitible by friction in air at room temperatures, as stated in the literature, I have observed that the substantially pure thorium described above may be heated in air to about 450° C. before igniting. The discrepancies referred to confirm my belief that substantially pure thorium was unknown until prepared by me.

It will be noted that the temperature of hydride formation is lower than the oxidizing temperature if the thorium used is substantially pure, and this is a circumstance of major importance in connection with my invention.

Hydrogen, even when carefully purified, usually contains small amounts of oxygen, either free or as water vapor. If thorium is heated to such temperatures as 600° C. in hydrogen containing oxygen, part or all of the oxygen present unites with thorium, and the thorium hydride produced as the main product is so contaminated with oxide as to become more or less unsuitable for the alloying process. I prefer therefore to produce the hydride at a temperature below 450° C. To insure the saturation of the thorium with hydrogen, the heating period may be prolonged, and there will be no oxidation of the material so long as the temperature does not rise to 450° C. I prefer a temperature of 300° C. to 375° C. as this is well below the oxidation temperature but sufficiently high for complete conversion of the thorium to hydride.

I claim:

1. A process of preparing thorium hydride which comprises heating substantially pure thorium powder in hydrogen at a temperature sufficiently high to insure saturation of the metal with hydrogen, but below 450° C., until the metal is substantially completely converted into hydride.

2. A process of preparing thorium hydride which comprises heating the herein described substantially pure grade of thorium powder in hydrogen at a temperature approximately within the range 300° C. to 375° C. until the metal is substantially completely converted into hydride.

In testimony whereof, I affix my signature.

HUGH S. COOPER.